(12) United States Patent
Follesa et al.

(10) Patent No.: US 10,070,197 B2
(45) Date of Patent: Sep. 4, 2018

(54) METHOD AND APPARATUS FOR IMPROVED NETWORK OPTIMIZATION FOR PROVIDING VIDEO FROM A PLURALITY OF SOURCES TO A PLURALITY OF CLIENTS

(71) Applicant: Alcatel Lucent, Boulogne Billancourt (FR)

(72) Inventors: Gianluca Follesa, Sint-Niklaas (BE); Steven Van Den Berghe, Zottegem (BE); Hemi Trickey, Naperville, IL (US); Annelies Van Moffaert, Berchem (BE); David Diner, Aurora, IL (US)

(73) Assignee: Alcatel Lucent, Boulogne-Billancourt (FR)

( * ) Notice: Subject to any disclaimer, the term of this patent is extended or adjusted under 35 U.S.C. 154(b) by 0 days.

(21) Appl. No.: 14/892,348

(22) PCT Filed: May 20, 2014

(86) PCT No.: PCT/EP2014/060273
§ 371 (c)(1),
(2) Date: Nov. 19, 2015

(87) PCT Pub. No.: WO2014/187789
PCT Pub. Date: Nov. 27, 2014

(65) Prior Publication Data
US 2016/0219342 A1      Jul. 28, 2016

(30) Foreign Application Priority Data

May 23, 2013   (EP) .................................... 13305664

(51) Int. Cl.
*H04N 7/173*        (2011.01)
*H04N 21/6373*   (2011.01)
(Continued)

(52) U.S. Cl.
CPC ..... *H04N 21/6373* (2013.01); *H04L 65/4084* (2013.01); *H04L 65/4092* (2013.01);
(Continued)

(58) Field of Classification Search
None
See application file for complete search history.

(56) References Cited

U.S. PATENT DOCUMENTS

2010/0079670 A1*  4/2010  Frazier ............... H04N 5/44591
                                                                                        348/564
2010/0316066 A1*  12/2010  Leung ............... H04N 21/44209
                                                                                        370/468
(Continued)

FOREIGN PATENT DOCUMENTS

WO      WO 97/23096 A1       6/1997
WO      WO 2013/048484 A1   4/2013

OTHER PUBLICATIONS

European Patent App. No. 13305664.8, Extended European Search Report, dated Sep. 9, 2013, 6 pp.
(Continued)

*Primary Examiner* — William J W Kim
(74) *Attorney, Agent, or Firm* — Fay Sharpe LLP (57) ABSTRACT

A method for improving quality of experience in a communication between a first plurality of video sources (Cam1, cam2, cam3) to a second plurality of video clients (C1, C2) via a video composing module (VSE) in between said first plurality of video sources and said second plurality of clients, and triggered by a dispatching unit (D) controlling which clients and video sources are participating in said communication, and which respective composed videos (VcompC1, VcompC2) are to be provided from said video composing module (VSE) to respective clients (C1, C2) of said second plurality, comprises the steps of :—receiving from said dispatching unit (D) client related parameters
(Continued)

(CP1, CP2) indicating display and layout configuration of said respective composed video (VcompC1, VcompC2) to be provided to said respective client (C1, C2),—identifying a subset of video sources from said first plurality for being coupled to an intermediate video composing module (VSRR)—determining an optimized video feed configuration for the communication of an intermediate composed video (Vcompr) provided by and between said intermediate video composing module (VSRR) to said video composing module (VSE) based on said client related parameters and on network restriction parameters (NC(t)),—adapting the respective video communication session between the intermediate video composing module (VSRR) and the video composing module (VSE) based on the provision of said optimized video feed configuration as a control signal to said intermediate video composing module (VSRR).

16 Claims, 4 Drawing Sheets

(51) Int. Cl.

| | | |
|---|---|---|
| *H04L 29/06* | (2006.01) | |
| *H04N 7/18* | (2006.01) | |
| *H04N 21/24* | (2011.01) | |
| *H04N 21/218* | (2011.01) | |
| *H04N 21/2365* | (2011.01) | |
| *H04N 21/647* | (2011.01) | |
| *H04N 21/81* | (2011.01) | |
| *H04N 21/238* | (2011.01) | |
| *H04N 21/258* | (2011.01) | |

(52) U.S. Cl.
CPC ............ *H04L 65/605* (2013.01); *H04L 65/80* (2013.01); *H04N 7/181* (2013.01); *H04N 21/21805* (2013.01); *H04N 21/2365* (2013.01); *H04N 21/23805* (2013.01); *H04N 21/2402* (2013.01); *H04N 21/25825* (2013.01); *H04N 21/64769* (2013.01); *H04N 21/814* (2013.01)

(56) References Cited

U.S. PATENT DOCUMENTS

| | | | | |
|---|---|---|---|---|
| 2011/0276714 | A1* | 11/2011 | Yoshida ........... | H04N 21/23406 709/233 |
| 2012/0098969 | A1* | 4/2012 | Wengrovitz ........... | H04N 7/185 348/159 |
| 2013/0163430 | A1* | 6/2013 | Gell ................. | H04N 21/23439 370/235 |
| 2013/0332620 | A1* | 12/2013 | Gahm .............. | H04N 21/23805 709/231 |

OTHER PUBLICATIONS

PCT Pat. App. No. PCT/EP2014/060273, Written Opinion of the International Searching Authority, dated Jun. 25, 2014, 5 pp.
International Search Report for PCT/EP2014/060273 dated Jun. 25, 2014.

* cited by examiner

METHOD AND APPARATUS FOR IMPROVED NETWORK OPTIMIZATION FOR PROVIDING VIDEO FROM A PLURALITY OF SOURCES TO A PLURALITY OF CLIENTS

The present invention relates to a method for optimizing network resource utilization, more in particular in end-to-end video communications where a plurality of video sources are providing their respective video feeds in a particular combination to another plurality of clients.

Present systems for distribution of video from e.g. surveillance cameras to a plurality of clients, via a video server platform for processing the video feeds from the cameras into a composed video for subsequent delivery to respective clients, are currently deployed in emergency situations. In this situation the mobile clients are e.g. mobile devices such as tablets or smart phones positioned in police cars or in fire trucks. The video server platform thereby not only generates a composed video to be transmitted to these mobile clients, but also takes care of the allocation of bitrate for each transmission between the server and the respective client.

To take into account fluctuations of network conditions, solutions of adaptive video coding can be used, but such an approach is tuned for fairly small fluctuations in target bitrate. Moreover they are solely governed by network availability parameters.

It is therefore an object of embodiments according to the present invention to provide a method for dynamically adapting video bandwidth, not only to take into account a large range of changing network conditions but also requirements from the end-user's applications.

This object is solved via the provision of a method for improving quality of experience in a communication between a first plurality of video sources to a second plurality of video clients via a video composing module in between said first plurality of video sources and said second plurality of clients, and triggered by a dispatching unit controlling which clients and video sources are participating in said communication, and which respective composed videos are to be provided from said video composing module to respective clients of said second plurality, said method comprising the steps of:
- receiving from said dispatching unit client related parameters indicating display and layout configuration of said respective composed video to be provided to said respective clients,
- identifying a subset of video sources from said first plurality for being coupled to an intermediate video composing module
- determining an optimized video feed configuration for the communication of an intermediate composed video provided by and between said intermediate video composing module to said video composing module based on said client related parameters and on network restriction parameters,
- adapting the respective video communication session between the intermediate video composing module and the video composing module based on the provision of said optimized video feed configuration as a control signal to said intermediate video composing module.

By the provision of an intermediate video composing module in between a subset of the plurality of video sources and the main video composing module, it is possible to adapt part of the communication session between the cameras and the video composing module via adaptation of the uplink communication session between the intermediate composing module and the video composing module.

Such a solution can be very convenient in case the video sources are not able to adjust their communication parameters, e.g. in terms of resolution, frame rate etc., which can be the case for older types of surveillances cameras. By providing an intermediate node in the upstream part, being the part between the video sources and the video composing module, and which intermediate node can possibly already do part of the composition into an intermediate composed video stream, the intermediate node can adapt the communication session between itself and the video composing module in terms of frame rate, resolution etc. The intermediate video stream is further provided by the intermediate video composing module to the video composing module. The latter will further create the respective downstream composed video streams to the respective clients. In this way adaptivity of the upstream communication link to both network and client requirements can be obtained.

In an embodiment the method may comprise, in case at least one video source is identified as not belonging to said subset, an additional step of determining at least one optimized video feed configuration between said at least one video source and said video composing module based on said client related parameters and on network restriction parameters and a step of adapting the at least one video communication session between said at least one video source and the video composing module via the provision of the at least one optimized video feed configuration as a control signal to said at least one video source.

This even provides more versatility in case other cameras of the plurality do have the possibility of directly adapting their parameters in terms of bitrate, resolution etc. In order not to overload the intermediate servers, these cameras could then be directly controlled by the video controller.

In a further embodiment the determination and adaptation is further performed upon detecting changing network conditions, thereby influencing said network restriction parameters.

This leads to better adaptivity to changing network conditions.

In yet another embodiment the determination and adaptation is further performed upon receiving client feedback information.

This further provides adaptivity of the sessions based on client feedback.

The present invention relates as well to embodiments of a video server controller adapted to control video communications between a first plurality of video sources to a second plurality of video clients via a video composing module in between said first plurality of video sources and said second plurality of clients, said video server controller being adapted to receive information from a dispatching unit informing said video server controller which clients and video sources are participating in said communication, and which respective composed videos are to be provided from said video composing module to respective clients of said second plurality, said video server controller further being adapted to
- receive from said dispatching unit client related parameters indicating display and layout configuration of said respective composed video to be provided to said respective clients,
- receive network restriction parameters from a network broker module,
- identify a subset of video sources from said first plurality for being coupled to an intermediate video composing module in between said first subset of video sources and said video composing module, determine an optimized video feed configuration for the communication of an intermediate composed video provided by and between said intermediate video composing module to said video composing module based on said client related parameters and on network restriction parameters, adapting the respective video communication session between the intermediate video composing module and the video composing module based on the provision of said optimized video feed configuration as a control signal to said intermediate video composing module.

In a variant embodiment the video server controller is further adapted to determine, in case at least one video source of said first plurality is identified as not belonging to said first subset, at least one optimized video feed configuration between said at least one video source and said video composing module based on said client related parameters and on said network restriction parameters, to adapt the at least one video communication session between said at least one video source and the video composing module by providing said at least one optimized video feed configuration as at least one control signal to said at least one video source.

The present invention relates as well to embodiments of an intermediate video composing module for being coupled between a subset of a first plurality of video sources and a video composing module, said intermediate video composing module being adapted to receive video information from said video sources of said subset, to receive from a video server controller coupled to said intermediate video composing module and to said video composing module a control signal, to derive from said control signal parameters associated to an optimized feed configuration, and to use said parameters for generating an intermediate composed video stream from said video sources coupled to said intermediate video composing module for further provision to said video composing module.

The present invention relates as well to embodiments of video composing module and of a computer program for performing the aforementioned methods.

It is to be noticed that the term 'coupled', used in the claims, should not be interpreted as being limitative to direct connections only. Thus, the scope of the expression 'a device A coupled to a device B' should not be limited to devices or systems wherein an output of device A is directly connected to an input of device B. It means that there exists a path between an output of A and an input of B which may be a path including other devices or means.

It is to be noticed that the term 'comprising', used in the claims, should not be interpreted as being limitative to the means listed thereafter. Thus, the scope of the expression 'a device comprising means A and B' should not be limited to devices consisting only of components A and B. It means that with respect to the present invention, the only relevant components of the device are A and B.

The above and other objects and features of the invention will become more apparent and the invention itself will be best understood by referring to the following description of an embodiment taken in conjunction with the accompanying drawings wherein.

The description and drawings merely illustrate the principles of the invention. It will thus be appreciated that those skilled in the art will be able to devise various arrangements that, although not explicitly described or shown herein, embody the principles of the invention and are included within its spirit and scope. Furthermore, all examples recited herein are principally intended expressly to be only for pedagogical purposes to aid the reader in understanding the principles of the invention and the concepts contributed by the inventor(s) to furthering the art, and are to be construed as being without limitation to such specifically recited examples and conditions. Moreover, all statements herein reciting principles, aspects, and embodiments of the invention, as well as specific examples thereof, are intended to encompass equivalents thereof.

It should be appreciated by those skilled in the art that any block diagrams herein represent conceptual views of illustrative circuitry embodying the principles of the invention. Similarly, it will be appreciated that any flow charts, flow diagrams, state transition diagrams, pseudo code, and the like represent various processes which may be substantially represented in computer readable medium and so executed by a computer or processor, whether or not such computer or processor is explicitly shown.

Embodiments of the present invention are for instance used in deployments of private networks for security or emergency purposes, e.g. networks where inputs from surveillance cameras will be provided to mobile devices in police cars. In this case the network will usually be a wireless network, but in other situations the clients can be coupled to a fixed network. In yet other situations the network can be comprised of any combination of both fixed and mobile portions.

Figure 1:
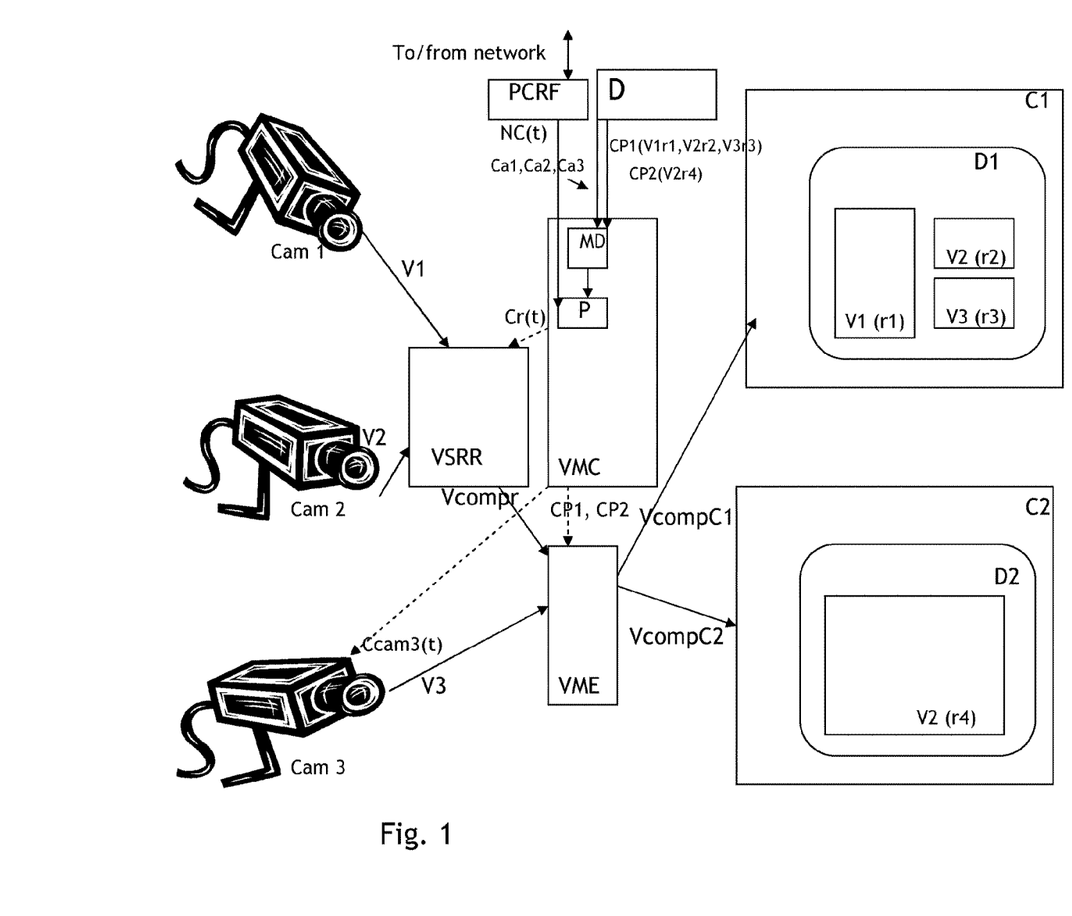
FIG. 1 shows a situation wherein an embodiment of a video server controller and of an intermediate composing module are used for implementing an embodiment of the method.

In FIG. 1 three cameras, respectively denoted cam 1, cam2 to cam3 provide their video output, also called video feed and respectively denoted V1,V2 to V3, either directly or indirectly, to a video composing module, denoted VSE. This video composing module VSE is adapted to mix or combine video inputs it receives into one or more dedicated composed videos, and is further adapted to operate under control of a video server controller VMC. In some embodiments, which are not shown on the figures, both VSE and VMC can be part of one single video server platform. It is to be remarked that in such embodiments such partition in different server modules may not be present and that one single video server may be adapted to perform both the composing and the control functions by e.g. one single processor. In other embodiments, the modules VMC and VSE can be further implemented on separate processors not part of the same physical server, but are communicatively coupled such as to form one functional video server or video server platform entity.

In the situation depicted in FIG. 1 some cameras thus provide their video feeds not directly to the video composing module VSE, but are first connected to an intermediate video composing server VSRR. This intermediate video composing module VSRR is coupled to a subset, comprising in the example of FIG. 1, cam 1 and cam2, of the first plurality of video sources cam1, cam2, and cam3. Which cameras belong to this subset may be determined by the video server controller VMC. This determination can be very simple, e.g. in case some cameras are wired to one specific intermediate video composing module, e.g. 3 cameras positioned in a police car, with an VSRR on board. In that case this information may have been provided by the VMC by means of the dispatching unit. Alternatively the VSRR can check this automatically via hardwired connections and provide this information also to the VMC.

This determination can also vary in function of changing emergency events as will be explained in a later paragraph. The intermediate video composing module VSRR is as well coupled to the video composing module VSE, and is further adapted to receive the video information V1, V2 from the video sources of said subset, to receive from the video server controller a control signal denoted Cr(t), to derive from this control signal parameters associated to an optimized feed configuration between VSRR and VSE, and to further use these parameters for generating an intermediate composed video stream Vcompr from the video information from the video sources of the subset, for further provision to the video composing module VSE. Furthermore VSRR can adapt the communication session between itself and VME as will be explained in a later paragraph.

The video composing module VSE itself is thus adapted to receive a number of video feeds, which, can be provided either directly by some sources of the plurality of surveillance cameras, directly connected to the VSE, and video feeds from one or more intermediate video composing modules coupled to VSE. In the situation depicted in FIG. 1, only one intermediate video composing modules VSRR is coupled to VSE. The video composing module VSE is further adapted to, if necessary, decode the received video inputs from the cameras, and/or from the VSRR, and to make several compositions into several respective composed videos, for each respective client, based on the respective video feed inputs. VSE can also optionally encode the respective composed videos before providing them to the respective clients. These respective composed video streams provided by VSE to the clients are denoted VcompC1 and VcompC2 in FIG. 1, and are sent to respective clients, denoted C1 and C2 in FIG. 1.

In the previously mentioned example the clients are mobile devices with receivers which can e.g. be placed in police cars, so in this case the coupling between VSE and the clients is provided via a mobile network. However in other environments, e.g. where inputs of surveillance cameras are composed and dispatched to a plurality of emergency centers such as e.g. hospitals or a fire brigade, these connections can be provided via a fixed network or any combination of fixed or mobile network.

The clients themselves usually have a display, respectively denoted D1 and D2, for showing the respective received composed videos VcompC1 and VcompC2.

The control and make-up of the composition of the respective composed video streams VcompC1 and VcompC2 is performed by the controller VMC. In the embodiment of FIG. 1 this module may comprise a memory MD, for receiving control input information from a dispatching module D. Such a dispatching module may comprise an interface to the VMC, for providing manual inputs from a person at e.g. a police or emergency dispatching center, which inputs may comprise which camera feeds have to be provided to which clients. In the example depicted in FIG. 1, the dispatching center had decided that C1 has to receive all camera feeds, while C2 only has to receive the video from camera Cam2.

The dispatching center D also knows the technical capabilities of the displays of all these clients, their roles (e.g. which police car needs to receive most information), and their limits and technical possibilities characteristics. Based on this, this dispatcher may have decided that client C1 has to receive video 1 (V1) at a resolution denoted r1, video 2 (V2) at a resolution r2, and video 3 (V3) at a resolution r3. The dispatching unit thus provides this information with respect to the composition (which feeds and in which layout and resolution) and configuration of the displays of the different clients to the video server controller module VMC. In FIG. 1 this is denoted by means of the arrow between the dispatching module D to the memory device MD within the video server controller VMC. In FIG. 1 all this information is denoted as CP1(V1r1, V2r2, V3r3).

Similarly, this dispatching unit may have also decided that client 2 will receive video 2 at another resolution, e.g. r4. This information is provided as well by the dispatching module to the memory device MD. In FIG. 1 this information is denoted as CP2(V2r4).

The dispatching unit is also knowledgeable about the video sources or cameras themselves. For the situation depicted in FIG. 1 the dispatcher thus knows that cam1 and cam 2 are e.g. not able to adjust their video feeds in terms of resolution, frame rate etc, or only have limited capabilities for doing so. The dispatcher is also knowledgeable about the possibilities of cam3, which, in this exemplary situation, is thus able to adapt its camera settings e.g. in terms of frame rate, resolution, when providing its video feeds to the composer module.

The information with respect to the camera characteristics is denoted Ca1, Ca2 and Ca3 in FIG. 1, for indicating respective information of cam1, cam2 and cam3.

The dispatcher thus also provides this information to the video server controller.

Embodiments of the present invention relate to the video server controller function VMC which is further adapted, e.g. by means of a processing unit P therein, to receive the client specific display and layout configuration data, denoted CP1 and CP2, network restriction parameters, denoted NC(t) such as maximum bit rate for the communication session between the cameras and the video composing module VSE, and information of the camera characteristics, denoted Ca1 to Ca3. This video server controller VMC is therefore adapted to determine from the inputs relating to the client display configuration, and network restriction parameters respective optimum video feed configuration parameters for the respective upstream video sessions between the cameras or video feeds and the video composing module, or, if these cannot be adapted, between the VSRR and the VSE. These video feed configuration parameters are then transmitted as control signals to the respective video sources, and/or to the VSRR, which devices, upon receipt thereof should accordingly change or adapt or keep, depending on the values of these parameters, the video transmission between either the cameras and the video composing module or either between the VSRR and the VSE. In case the cameras are not able to adapt their video transmission parameters, such as is the case for cam 1 and cam 2 in the example depicted in FIG. 1, the video server controller will thus not transmit these control signals to the cameras themselves, but to the intermediate composing module VSRR. The latter will then, upon receipt thereof take these parameters into account for creating of the intermediate composed video stream. In the embodiment of FIG. 1 this intermediate composed video stream Vcompr will then comprise two streams: a First one with V1(r1) and with V2(r2) in the configuration as requested by C1, and a second one containing V2(r4). Alternatively Vcompr can only comprise V1(r1) and V2(r4), so that the adaptation of V2(r4) to V2(r2) can be performed within VSE itself.

On the other hand Cam3 is able to adapt its transmission parameters, so VMC can still transmit a control signal Ccam3(t) to Cam3, which, upon receipt thereof will then adapt its video transmission parameters.

The contents of these control signals, denoted Cr(t) for being provided to VSRR, and Ccam3(t), for being provided to Ccam3 will then comprise parameters relating to optimized video transmission between VSRR and VSE, and between Cam3 and VME, based upon the client's needs and on the network restrictions.

If, for instance, the maximum resolution at which video V3 is to be provided is only r3 (as in the example of FIG. 1), there is thus no need for camera3 to provide the video V3 at a higher resolution than the highest one required. These respective control signals Cr(t) and Ccam3(t) comprising information about the resolution, frames per second, group of pictures and bitrate, are thus generated and provided by VMC. VMC may thus also be able to decide which cameras of the first plurality are or will be coupled to VSRR. This decision can be based upon information provided by the dispatching unit about the camera capabilities, given by the signals Ca1 to Ca3.

The time dependency of these signals relates to the possibly varying bitrate available between the VSE server module and the respective cameras and in between VSE and VSRR and the cameras, and which can vary as a function of network resources.

The client configuration information CP1 and CP2, is as well provided to the video composer module VSE, which, upon receipt of the video feeds, either directly from the cameras themselves, either via the intermediate composing module, can then create the respective composed videos in accordance with this information and provide these separate videos adapted to the specific client needs to the respective clients.

The video server controller VMC is thus adapted to determine a dynamic configuration for each session between either the video sources and the composing module, in case the cameras can adjust themselves to comply to varying or requested conditions, or either between the VSRR and VSE in case previous mentioned adaptations are not possible. These parameters for the configuration are based not only on a combination of required layout and client display conditions, but thus also on network conditions. The network conditions, denoted NC (t) in FIG. 1, can indeed put a ceiling on the available bitrate between each source (the cameras) and the VSE or between VSRR and VSE on one hand, but also between the VSE and each client. These network conditions are in an LTE network provided by a module denoted PCRF, and would for instance comprise end-to-end delay, end-to-end jitter, bitrate per session etc as is well known by a person skilled in the art. In other types of networks another module can interface with the network and the VMC for providing these network condition parameters to the VMC. For the provision of these parameters one can rely on thus existing QoS management/brokering mechanisms such as the already mentioned PCRF functionality in LTE networks. Note that network resources might be variable themselves (e.g. for mobile users moving between cells), which might trigger a feedback (e.g. pre-emption of a session) requiring to re-optimize the constellation of sessions. The variability of the network resources as a function of time is thus also taken into account when determining the camera parameters and/or the parameters towards the intermediate composing module, hence their dependency on the time.

Figure 2:
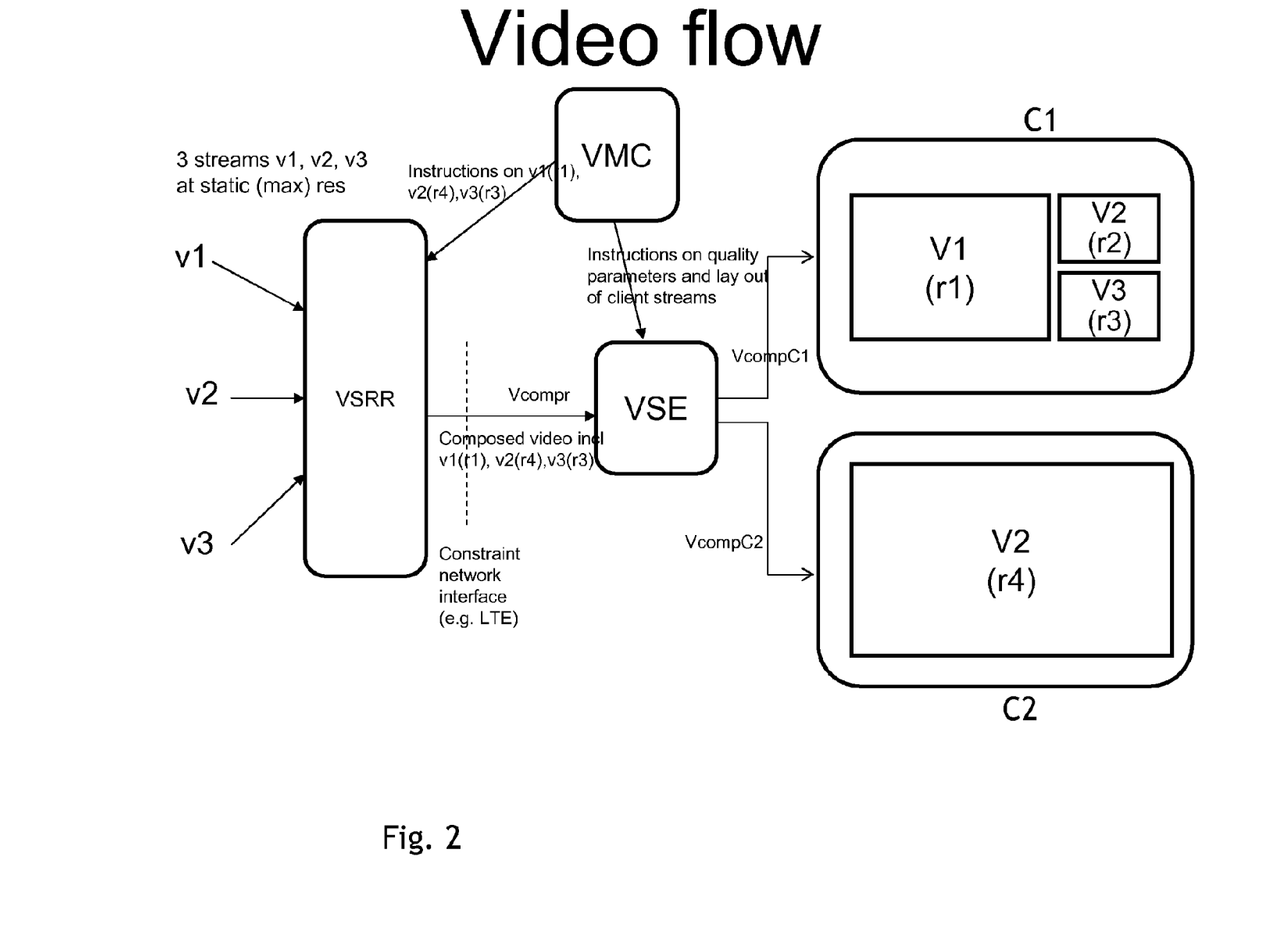
FIG. 2 shows another embodiment where all video sources are coupled to an intermediate composing module.

In the embodiment depicted in FIG. 2 none of the cameras of the first plurality is able to adapt its settings. In this case they all provide their video feeds to the intermediate video composing module VSRR. In the situation depicted in FIG. 2 again client C1 has to receive V1 in resolution r1, V2 with resolution r2 and V3 with resolution r3, while client C2 only has to receive V2 at resolution r4. This information is thus provided by the dispatching module (not shown on FIG. 2) to VMC which further provides this information to VSRR. The latter then generates an intermediate composed video Vcompr comprising V1 in resolution r1, V2 in resolution r4 and V3 in resolution r3. VSRR is then able to demultiplex the received intermediate composed video Vcompr again into its separate feeds, and is further adapted to generate two other composed videos, VcompC1 and VcompC2 from these feeds. It is to be remarked that in this embodiment VSRR thus also needs to generate V2(r2) from the received and demultiplexed Vcompr which will then first result in V2 at resolution r4. The way the camera streams are generated and optionally encoded in the combined VSRR output streams can vary but will be a trade-off between (min VSRR CPU, min VSRR CPU, min bit rate Vcompr, min VMC algorithm complexity, max quality of VcompCi).

In general Vcompr is also compressed within the VSRR as this will lead to utilization of less bandwidth. However this is optional.

Figure 3:
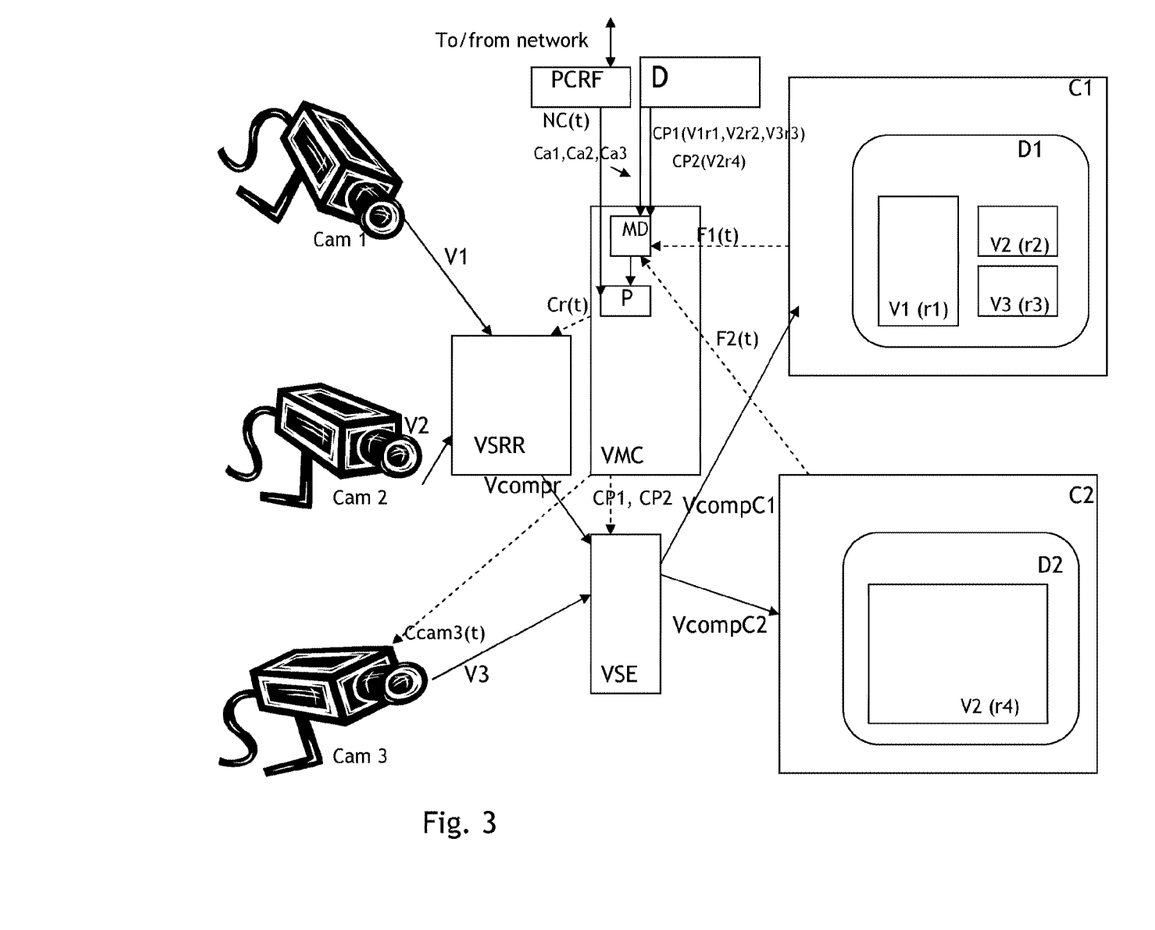
FIG. 3 shows another variant situation, where also client feedback is taken into account.

In another yet more complex embodiment also feedback from the clients, denoted F1(t) and F2(t) on FIG. 3, can be provided to VSRR. This can for instance be the case when a client wants to switch from a mosaic layout to a full screen view of a single video stream. For example even when the dispatcher had earlier decided that C1 has as default layout of a 2×2 mosaic, C1 can still autonomously decide to switch between this default 2×2 and a full screen view of one of the 4 videos of the mosaic. Other clients can have the authority to select which cameras to display.

This interaction information is thus shown in FIG. 3 by means of information F1 (t) and F2(t) being provided from the respective clients to the video server controller VMC. In some situations the client can even also provide feedback on the client video processing conditions as packet delay, packet drop, change in hardware at the display or decoder etc. This can also be provided as a feedback signal from the respective clients to the video server controller VMC.

Figure 4:
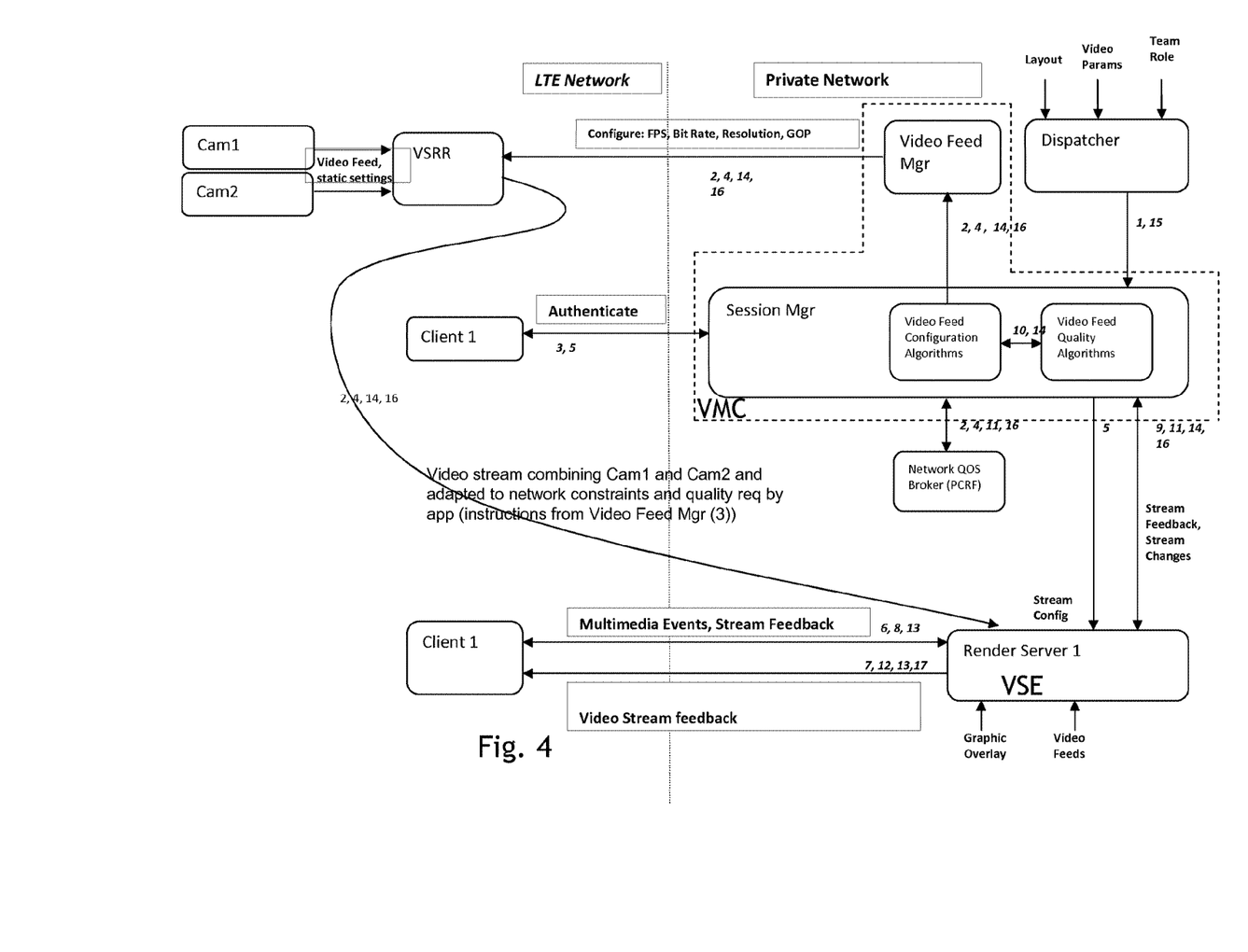
FIG. 4 shows more details in the signals exchanged between the cameras, intermediate composing module, video composing module and video server controller.

FIG. 4 gives a very detailed and specific implementation. In this embodiment the video server controller module comprises a video feed manager and a session manager. The Render Server module of FIG. 4 corresponds to the video composing module VSE in the previous figures. The steps as shown in FIG. 4 are the following:

1) Dispatcher creates an incident. Clients are allocated to a team in a certain role and video feeds are associated with the client.
2) Session manager asks the video feed manager to configure the video feeds with certain parameters (frames per second, bit rate, resolution, GOP, etc) and to start streaming the feeds. The video feed manager sets these parameters in the VSRR responsible for these video feeds. The Network QOS broker is informed to create a new upstream GBR tunnel for the video feeds with certain QOS parameters. These settings are for the video produced by the VSRR and sent over a constrained interface (eg LTE) between VSRR and VSE. VSRR receives statically configured individual camera streams over a local interface (e.g. fixed Ethernet) and combines these streams into a single output video after potentially downscaling the quality parameters (eg resolution and frame rate) of the individual camera streams 3) Client authenticates with session manager. The session manager retrieves information about the client's team, role and video feeds. It talks to the network QOS broker to assign QOS parameters to the client Guaranteed Bit Rate bearer tunnel 4) Session Manager of VMC determines the best video feed configuration based on how each client in the system is using the video feeds, i.e. the maximum bit rate, maximum resolution, maximum frames per second and asks the video feed manager to configure the video feeds with the best parameters. The Network QOS broker is informed of any changes for existing clients and a new GBR tunnel is created for the new client.

5) Session Manager assigns a render server VSE to render the video image that the client has been assigned. The client is asked to reconnect to the render server.

6) Client opens a signaling channel with the Render Server VSE. This bidirectional channel is used to send and receive signaling messages such as multimedia events and forward bearer stream feedback.

7) Render Server VSE builds a composite video which includes all video feeds and overlay graphics needed by the client.

8) client sends feedback information back to the Render Server VSE.

9) Render Server forwards the feedback information received from the client. The feedback information contains packet delay, packet drop and hardware capability of the client.

10) Session Manager in VMC determines the video stream to the client needs tuning. The video feed take this new adjustment into consideration and determine if the video feeds need to be reconfigured.

11) Session Manager in VMC tells render server VSE to reconfigure video streaming parameters to dynamically adjust to changing air interface conditions. The Network QOS broker is informed of any changes needed.

12) Render Server adjust the video stream to the client with the new parameters.

13) The client issues a multimedia event which causes the video rendering to change. The video stream changes to reflect this event.

14) The Render Server VSE informs the Session Manager in VMC about the video feed change which triggers the video feed algorithms to check if the video feeds need to be adjusted.

15) Dispatcher creates a change to the video feeds. The Session Manager determines if the video feeds used by all clients need to be adjusted based on the new event.

16) Session Manager reconfigures the Render Server to reflect the dispatcher event.

17) Render Server changes the stream to reflect the dispatcher event.

While the principles of the invention have been described above in connection with specific apparatus, it is to be clearly understood that this description is made only by way of example and not as a limitation on the scope of the invention, as defined in the appended claims.

The invention claimed is:

1. Method for improving utilization of resources in a network between a first plurality of video sources and a second plurality of video clients, said method comprising:

receiving control information from a dispatching unit at a video server controller, the control information indicating which video sources of the first plurality and which video clients of the second plurality are participating in video communications via the network, receiving client related parameters from said dispatching unit at the video server controller for the participating video clients, the client related parameters indicating respective display and layout configurations for respective composed videos to be provided to the respective participating video clients from a video composing module, identifying multiple video sources from said participating video sources to be coupled to an intermediate video composing module, determining an optimized video feed configuration for an intermediate video communication session between said intermediate video composing module and said video composing module based on said client related parameters and network restriction parameters, wherein video feeds from the multiple video sources are combined in the intermediate video communication session based on the optimized video feed configuration, dynamically adapting the optimized video feed configuration for the intermediate video communication session in response to changes in the client related parameters and the network restriction parameters, and sending a control signal based on the optimized video feed configuration from the video server controller to said intermediate video composing module, wherein the intermediate video composing module is configured to use the control signal to dynamically adapt the intermediate video communication session in response to changes in the optimized video feed configuration.

2. Method according to claim 1 wherein, for participating video sources not belonging to said multiple video sources, said method further comprising:

determining a further optimized video feed configuration for a further video feed between the corresponding participating video source and said video composing module, wherein the further optimized video feed configuration is based on said client related parameters for the participating video clients and the network restriction parameters, dynamically adapting the further optimized video feed configuration for the further video feed in response to changes in the client related parameters and the network restriction parameters, and sending a further control signal based on the further optimized video feed configuration from the video server controller to the corresponding participating video source, wherein the corresponding participating video source is configured to use the further control signal to dynamically adapt the further video feed in response to changes in the further optimized video feed configuration.

3. Method according to claim 1, further comprising:

detecting changing network conditions, wherein the network restriction parameters are based on the detected changing network conditions, wherein the determining of the optimized video feed configuration, the dynamic adapting of the optimized video feed configuration, and the sending of the control signal are further performed after the detecting of the changing network conditions.

4. Method according to claim 1, further comprising:
receiving client feedback information from at least one of the participating video clients,
wherein the determining of the optimized video feed configuration, the dynamic adapting of the optimized video feed configuration, and the sending of the control signal are further performed after the receiving of the client feedback information.

5. A non-transitory computer-readable medium storing program instructions that, when executed by at least one computer or processor, cause a video server controller to perform the method according to claim 1.

6. The method according to claim 1 wherein at least one composed video of the composed videos provided to the participating video clients is a composite video that includes video feeds originating from more than one of the participating video sources.

7. The method according to claim 1 wherein the intermediate video composing module is configured to combine the video feeds from the multiple video sources to form the intermediate video communication session.

8. Method according to claim 1, further comprising:
receiving the network restriction parameters from a network broker module at the video server controller.

9. The method according to claim 1 wherein the intermediate video composing module is configured to adapt the video feeds from the multiple video sources based on the control signal received from the video server controller and combine the video feeds from the multiple video sources to form the intermediate video communication session.

10. The method according to claim 1 wherein the control signal is used by the intermediate video composing module to dynamically adapt the intermediate video communication session in response to changes in the optimized video feed configuration.

11. Video server controller for improving utilization of resources in a network between a first plurality of video sources and a second plurality of video clients, said video server controller configured to:
receive control information from a dispatching unit indicating which video sources of the first plurality and which video clients of the second plurality are participating in video communications via the network,
receive client related parameters from the dispatching unit for the participating video clients, the client related parameters indicating respective display and layout configurations for respective composed videos to be provided to the respective participating video clients from a video composing module,
identify multiple video sources from said participating video sources to be coupled to an intermediate video composing module,
determine an optimized video feed configuration for an intermediate video communication session between said intermediate video composing module and said video composing module based on said client related parameters and network restriction parameters, wherein video feeds from the multiple video sources are combined in the intermediate video communication session based on the optimized video feed configuration,
dynamically adapt the optimized video feed configuration for the intermediate video communication session in response to changes in the client related parameters and the network restriction parameters, and
send a control signal based on the optimized video feed configuration to said intermediate video composing module.

12. Video server controller according to claim 11, wherein, for participating video sources not belonging to said multiple video sources, the video server controller is further configured to:
determine a further optimized video feed configuration for a further video feed between the corresponding participating video source and said video composing module, wherein the further optimized video feed configuration is based on said client related parameters for the participating video clients and said network restriction parameters,
dynamically adapt the further optimized video feed configuration for the further video feed in response to changes in the client related parameters and the network restriction parameters, and
send a further control signal based on the further optimized video feed configuration to the corresponding participating video source, wherein the corresponding participating video source is configured to use the further control signal to dynamically adapt the further video feed in response to changes in the further optimized video feed configuration.

13. The video server controller according to claim 11 wherein at least one composed video of the composed videos provided to the participating video clients is a composite video that includes video feeds originating from more than one of the participating video sources.

14. Video server controller according to claim 11 further configured to:
detect changing network conditions, wherein the network restriction parameters are based on the detected changing network conditions, and
further determine the optimized video feed configuration, dynamically adapt the optimized video feed configuration, and send the control signal after detecting the changing network conditions.

15. Video server controller according to claim 11 further configured to;
receive client feedback information from at least one of the participating video clients, and
further determine the optimized video feed configuration, dynamically adapt the optimized video feed configuration, and send the control signal after receiving the video client feedback information.

16. Video server controller according to claim 11 further configured to:
receive the network restriction parameters from a network broker module.

* * * * *